US012560565B2

(12) United States Patent
Geier et al.

(10) Patent No.: US 12,560,565 B2
(45) Date of Patent: *Feb. 24, 2026

(54) ELECTROMAGNETIC IMPEDANCE SPECTROSCOPY APPARATUS AND RELATED PLANAR SENSOR SYSTEM

(71) Applicant: TRANSTECH SYSTEMS, INC., Latham, NY (US)

(72) Inventors: Manfred Geier, Oakland, CA (US); Adam D. Blot, Altamont, NY (US); Andrew J. Westcott, Troy, NY (US)

(73) Assignee: TRANSTECH SYSTEMS, INC., Latham, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,643

(22) Filed: May 5, 2023

(65) Prior Publication Data
US 2023/0273137 A1 Aug. 31, 2023

Related U.S. Application Data

(63) Continuation of application No. 17/669,687, filed on Feb. 11, 2022, now Pat. No. 11,680,920, which is a
(Continued)

(51) Int. Cl.
*G01N 27/02* (2006.01)
*G01N 27/22* (2006.01)

(52) U.S. Cl.
CPC ......... *G01N 27/026* (2013.01); *G01N 27/226* (2013.01)

(58) Field of Classification Search
CPC .. G01N 27/026; G01N 27/226; G01N 27/223; G01N 33/246; G01N 33/383;
(Continued)

(56) References Cited

U.S. PATENT DOCUMENTS 6,414,497 B1 7/2002 Sovik ..................... G01N 27/02
324/687
9,494,538 B2 11/2016 Kozicki et al.
(Continued)

FOREIGN PATENT DOCUMENTS

JP 2017215346 A 12/2017

OTHER PUBLICATIONS

PCT International Search Report and Written Opinion for International Application No. PCT/US2019/013936, dated Apr. 8, 2019, 9 pages.
(Continued)

*Primary Examiner* — Alvaro E Fortich
(74) *Attorney, Agent, or Firm* — Hoffman Warnick LLC

(57) ABSTRACT

According to various implementations, an apparatus for electromagnetic impedance spectrographic characterization of a material under test (MUT) includes: a planar array of at least two electrodes configured to be placed in electromagnetic communication with the MUT, wherein during operation of the planar array, at least one of the electrodes comprises a transmitting electrode for transmitting an electromagnetic signal over a range of frequencies through the MUT to at least one receiving electrode in the planar array; and a backer ground plate at least partially surrounding the at least two electrodes, the backer ground plate being electrically grounded and insulated from the at least two electrodes, wherein the backer ground plate extends from a plane formed by the at least two electrodes and separates the at least two electrodes to create an electrically isolated volume proximate to the at least two electrodes.

18 Claims, 9 Drawing Sheets

Related U.S. Application Data continuation of application No. 16/962,621, filed as application No. PCT/US2019/013936 on Jan. 17, 2019, now Pat. No. 11,268,922.

(60) Provisional application No. 62/619,275, filed on Jan. 19, 2018.

(58) Field of Classification Search
CPC ...... G01N 33/24; G01N 17/02; G01N 27/041; G01N 27/20; G01N 27/90; H01R 4/66; H01R 43/00; H01R 4/58; H01R 4/62; G01R 35/005; G01R 1/06772; G01R 31/2831; G01R 31/2879; G01R 31/30; G01R 31/303; G01R 19/0092; G01R 1/06766; G01R 27/00; G01R 27/02; G01R 27/32; G01R 31/343; G01R 31/50; G01R 1/06738; G01R 31/25; G01R 31/2886; G01R 31/312; G01R 31/70; G01R 27/20; G01R 29/0878; G01R 31/2617; G01R 31/2632; G01R 31/2829; G01R 35/007; G01R 5/28; G06F 3/0446; G06F 2203/04808; G06F 3/0237; G06F 3/04886; G06F 3/04186; G06F 3/044; G06F 3/0445; G01V 3/15; G01V 3/08; G01V 3/088; G01B 7/02; G01B 7/08; G01P 21/00
See application file for complete search history.

(56)     References Cited

U.S. PATENT DOCUMENTS

| | | | | |
|---|---|---|---|---|
| 11,268,922 | B2 * | 3/2022 | Geier | G01N 27/226 |
| 11,680,920 | B2 * | 6/2023 | Geier | G01N 27/226 |
| | | | | 324/691 |
| 2005/0267700 | A1 | 12/2005 | Gamache | G01N 27/028 |
| | | | | 702/65 |
| 2013/0088245 | A1 | 4/2013 | Sezginer | B82Y 10/00 |
| | | | | 324/679 |
| 2014/0026652 | A1 | 1/2014 | Cummins | G01N 27/223 |
| | | | | 73/335.04 |
| 2015/0137831 | A1 * | 5/2015 | Pluta | G01R 33/323 |
| | | | | 324/647 |
| 2015/0285752 | A1 * | 10/2015 | Kozicki | B65G 43/00 |
| | | | | 324/649 |
| 2016/0054247 | A1 * | 2/2016 | Colosimo | G01N 27/026 |
| | | | | 324/629 |
| 2016/0172755 | A1 | 6/2016 | Chen et al. | |

OTHER PUBLICATIONS

Yunus et al., "Development of planar electromagnetic sensors for measurement and monitoring of environmental parameters." Measurement Science Technology, Jan. 18, 2011, vol. 22, p. 10.

* cited by examiner

314

304

300

301

RX

CONDUCTIVE
BACKER GROUND
PLATE

TX

ELECTROMAGNETIC IMPEDANCE SPECTROSCOPY APPARATUS AND RELATED PLANAR SENSOR SYSTEM

PRIORITY CLAIM(S)

This application claims priority to co-pending U.S. patent application Ser. No. 17/669,687 (filed Feb. 11, 2022), which itself claims priority to U.S. patent application Ser. No. 16/962,621 (now U.S. Pat. No. 11,268,922, filed on Jul. 16, 2020), which itself claims priority to International Patent Application No. PCT/US2019/013936 (filed on Jan. 17, 2019), which itself claims priority to U.S. Provisional Patent Application No. 62/619,275 (filed on Jan. 19, 2018), the entire contents of each of which is hereby incorporated by reference in its entirety.

TECHNICAL FIELD

Aspects of the disclosure relate to electromagnetic impedance spectroscopy. In particular, aspects of the disclosure relate to an apparatus and related planar sensor system for use in characterizing selected portions of a material under test.

BACKGROUND

In U.S. Pat. No. 7,219,024 (which is hereby incorporated by reference in its entirety), a system is described for conducting electromagnetic impedance spectroscopy to non-invasively determine the in-place density (i.e., compaction) and moisture of various engineering materials with specific interest in soils. A fundamental component of this conventional system is the sensor system. Current testing standards for in-place soil testing, such as ASTM standard D1556 (for sand cone method), ASTM standard D6938 (for nuclear gauge method), and ASTM standard D7830 (for the method described in U.S. Pat. No. 7,219,024) do not provide a specific depth of soil to be tested. The physical design of the apparatus for the sand cone limits the testing depth to 4 to 6 inches, while the nuclear gauge provides for the placement of the radioactive source to a depth of 10 to 12 inches. Both the sand cone method and the nuclear gauge method require invasive procedures. In order to match the depth into the subsurface sampled by the accepted sand cone method, the sensor system disclosed in U.S. Pat. No. 7,219,024 must sample the soil to a depth of at least 4 inches below the surface. However, as noted herein, the nuclear gauge method provides for the placement of a radioactive source 10 to 12 inches into the soil. It may be beneficial for the sensor assembly to sample to a depth of at least 6 inches. However, the signals received by the current art in sensor systems from depths exceeding 4 inches have an unacceptable level of noise, which makes it difficult to accurately measure the soil impedance and determine the soil properties at that depth.

BRIEF SUMMARY

All examples and features mentioned below can be combined in any technically possible way.

Aspects of the disclosure provide for an electromagnetic sensor apparatus which overcomes the limitations in the current art to increase the depth of measurement into the surface and subsurface of a material under test (MUT) by reducing the noise of the received signals from greater depths (e.g., enhancing a signal to noise ratio (SNR) of signals received by one or more receiving electrodes). One implementation of the apparatus includes a sensor system including a transmitting electrode, a receiving electrode, and a backer ground plate that is configured to provide enclosed capacitive volume(s) above the transmitting electrode(s) and enclosed capacitive volume(s) above the receiving electrode(s). Various aspects focus on axisymmetric electrodes as described in U.S. Pat. No. 7,219,024, but additional aspects may utilize linear electrodes. The capacitive volumes may contain air or some other dielectric material.

The objective of the enclosed capacitive volumes is to isolate and control the effects of the field lines which emanate from both the transmitting electrode and the receiving electrode and go to the backer ground plate, and the field lines that pass through the soil and go to the backer ground plate. One group of field lines are proximate the transmitting electrode, transverse the soil at a shallow depth and interact with the backer ground plate in the region of the transmitting electrode. These field lines have greater strength (relative to other lines described herein) and are minimally modified by their route through the soil. Field lines will also penetrate deeply into the subsurface of the soil and interact with the backer ground plate in the region proximate the receiving electrode, as well as with the receiving electrode itself. These field lines will have less strength and are more affected (e.g., modified) by their route through the soil. In the sensor system of U.S. Pat. No. 7,219,024, the interaction of all of these field lines creates a varying field in the volume created by the electrodes and the intermediate ground. This varying field produces an uncontrolled parasitic capacitance that increases the noise level relative to the received signal, which inhibits accurate determination of the measured impedance. The creation of enclosed and separate capacitive volumes, the geometry and volumes of which can be designed to control the degree of the parasitic capacitance, can significantly reduce this problem (e.g., controlling parasitic capacitance from field lines penetrating distinct depths of the MUT).

The preceding description concerns the electromagnetic sensor described in U.S. Pat. No. 7,219,024 (hereby incorporated by reference in its entirety), which has a single transmitting electrode and a single receiving electrode in an axisymmetric configuration. However, aspects of the disclosure can be utilized to improve other sensor systems that have a single transmitting electrode and multiple receiving electrodes, such as the systems described in U.S. Pat. No. 9,804,112 (e.g., at FIG. 1). Additionally, aspects of the disclosure can be utilized to improve sensor systems having multiple transmitting and receiving electrodes, such as the systems described in U.S. Pat. No. 9,804,112 (e.g., at FIG. 2) or US Patent Publication No. 2016/0161624 (e.g., at FIG. 10), both of which are hereby incorporated by reference in their entirety.

Additional embodiments of the disclosure include use of a backer ground plate that is configured to provide enclosed capacitive volume(s) above each of the transmitting electrodes and enclosed capacitive volume(s) above each of the receiving electrodes, in configurations having a plurality of such electrodes.

In particular implementations, a sensor system includes: a planar array of at least two electrodes configured to be placed in electromagnetic communication with a material under test (MUT), wherein during operation of the planar array, at least one of the electrodes comprises a transmitting electrode for transmitting an electromagnetic signal over a range of frequencies through the MUT to at least one receiving electrode in the planar array; and a backer ground plate at least partially surrounding the at least two electrodes, the backer ground plate being electrically grounded and insulated from the at least two electrodes, wherein the backer ground plate extends from a plane formed by the at least two electrodes and separates the at least two electrodes to create at least one electrically isolated volume proximate to the at least two electrodes.

In additional particular implementations, a sensor system includes: an apparatus for communicating with a material under test (MUT), the apparatus having: a planar array of at least two electrodes configured to be placed in electromagnetic communication with the MUT, wherein during operation of the apparatus at least one of the electrodes comprises a transmitting electrode for transmitting an electromagnetic signal over a range of frequencies through the MUT to at least one receiving electrode in the planar array; and a backer ground plate at least partially surrounding the at least two electrodes, the backer ground plate being electrically grounded and insulated from the at least two electrodes, wherein the backer ground plate extends from a plane formed by the at least two electrodes and separates the at least two electrodes to create at least one electrically isolated volume proximate to the at least two electrodes; and a circuit coupled with the apparatus, the circuit configured to transmit a set of electromagnetic signals through the planar array to the MUT, and receive at least one return signal from the planar array.

In some cases, the backer ground plate is formed of an electrically conductive material.

In particular aspects, the backer ground plate includes a set of recesses corresponding with each of the at least two electrodes.

In certain implementations, the plane formed by the at least two electrodes is substantially parallel with a surface of the MUT.

In some aspects, the array of at least two electrodes includes axisymmetric circular electrodes.

In certain cases, the backer ground plate extends between neighboring electrodes in the array to the plane formed by the at least two electrodes.

In particular implementations, a first one of the at least two electrodes includes a central electrode and a second one of the at least two electrodes includes an outer electrode.

In some cases, the central electrode includes the transmitting electrode.

In certain aspects, the outer electrode includes the transmitting electrode.

In particular cases, the planar array of at least two electrodes is arranged in a linear configuration.

In some implementations, each of the at least two electrodes has a rectangular shape with rounded corners.

In certain implementations, any single electrode in the array includes the transmitting electrode and remaining electrodes in the array includes the at least one receiving electrode.

In particular cases, the transmitting electrode is selectable among the electrodes of the array, and is configured to change between the electrodes of the array.

In some aspects, the array includes a plurality of transmitting electrodes and a plurality of receiving electrodes.

In certain implementations, during operation of the apparatus, the planar array is in direct physical contact with the MUT and is electrically non-conductive with the MUT.

In particular aspects, the circuit includes a signal analyzer configured to compare the set of electromagnetic signals with the at least one return signal.

In some cases, the circuit further includes a computing device coupled with the signal analyzer, where the computing device is configured to determine a characteristic of the MUT based upon the comparison of the set of electromagnetic signals with the at least one return signal.

In certain aspects, determining the characteristic of the MUT includes: determining a difference in an aspect of the at least one return signal and an aspect of the set of electromagnetic signals; comparing the difference in the aspect to a predetermined threshold; and determining the characteristic of the MUT based upon the compared difference.

In some cases, during operation of the system, the planar array is in direct physical contact with the MUT and is electrically non-conductive with the MUT.

In certain aspects, the conductive backer ground plate extends between neighboring electrodes in the sensor array and defines a set of separate volumes corresponding with each of the at least two electrodes.

In particular implementations, the plane formed by the at least two electrodes and the conductive backer ground plate is substantially parallel with a surface of the MUT.

In some aspects, the array of at least two electrodes includes axisymmetric circular electrodes, where a first one of the at least two electrodes includes a central electrode and a second one of the at least two electrodes includes an outer electrode.

In certain implementations, the central electrode includes the transmitting electrode and wherein the outer electrode includes the receiving electrode.

In particular aspects, the central electrode includes the receiving electrode and wherein the outer electrode includes the transmitting electrode.

In some implementations, the planar sensor array is arranged in a linear rectangular configuration, where a first one of the at least two electrodes is a transmitting electrode and a second one of the at least two electrodes is a receiving electrode.

In certain aspects, a spacing of the conductive backer ground plate between the transmitting electrode and receiving electrode is sized to adjust for a depth of penetration and measurement into the MUT.

In particular implementations, each of the at least two electrodes has a rectangular shape with rounded corners.

In some cases, the array of at least two electrodes includes at least three electrodes arranged in a linear rectangular configuration.

In certain implementations, a single electrode in the planar sensor array includes the transmitting electrode and the remaining electrodes in the planar sensor array include the at least one receiving electrode.

In particular aspects, the planar sensor array includes a plurality of transmitting electrodes and a plurality of receiving electrodes.

In some cases, the transmitting electrode is selectable among the electrodes of the planar sensor array, and is configured to change between the electrodes of the planar sensor array.

In certain implementations, during operation of the apparatus, the planar sensor array is in direct physical contact with the MUT and is either electrically non-conductive with the MUT or electrically conductive with the MUT.

In particular cases, the circuit includes a signal generator operating over a range of frequencies for transmitting the electromagnetic signal from the transmitting electrode of the planar sensor system through the MUT and a signal analyzer configured to analyze the at least one return signal.

In some aspects, the circuit further includes a computing device coupled with the signal analyzer, where the computing device is configured to determine a physical property of the MUT based upon the transmitted electromagnetic signal and the at least one return signal.

In particular implementations, determining the physical property of the MUT includes: transmitting the electromagnetic signal over a range of frequencies from the transmitting electrode through the MUT to the receiving electrode; comparing the transmitted electromagnetic signal to the received signal to compute an electromagnetic property of the MUT; and correlating the computed electromagnetic property of the MUT with a physical property of the MUT to determine the physical property of the MUT.

In certain aspects, during operation of the system, the planar sensor array is in direct physical contact with the MUT and is either electrically non-conductive with the MUT or electrically conductive with the MUT.

In some cases, the conductive backer ground plate extends between neighboring electrodes in the sensor array in the plane of the electrodes and encompasses the electrodes to create a set of separate volumes corresponding with each of the at least two electrodes with the volumes for each electrode being individually optimized for minimal parasitic impedance.

In particular implementations, the plane formed by the at least two electrodes and the conductive backer ground plate is substantially parallel with a surface of the MUT.

In certain aspects, the array of at least two electrodes includes axisymmetric circular electrodes, wherein a first one of the at least two electrodes comprises a central electrode and a second one of the at least two electrodes comprises an outer electrode.

In some implementations, the array of at least two electrodes comprises axisymmetric circular electrodes, wherein the central electrode comprises the transmitting electrode and wherein the outer electrode comprises the receiving electrode.

In particular cases, the central electrode comprises the receiving electrode and the outer electrode comprises the transmitting electrode.

In some aspects, the planar array of two electrodes is arranged in a linear rectangular configuration with one being a transmitting electrode and one being a receiving electrode.

In certain implementations, the spacing of the conductive backer ground plate between the transmitting electrode and receiving electrode is sized to adjust for the depth of penetration and measurement into the MUT.

In particular aspects, each of the at least two electrodes has a rectangular shape with rounded corners.

In some cases, the planar array of at least three electrodes is arranged in a linear rectangular configuration.

In certain aspects, any single electrode in the array comprises the transmitting electrode and remaining electrodes in the array comprise the at least one receiving electrode.

In particular implementations, the array comprises a plurality of transmitting electrodes and a plurality of receiving electrodes.

In some aspects, the transmitting electrode is selectable among the electrodes of the array, and is configured to change between the electrodes of the array.

In particular cases, the circuit includes a signal generator and analyzer operating over a range of frequencies transmitting the electromagnetic signal from the transmitting electrode of the planar sensor system through the MUT and configured to receive the return signal to analyze the at least one return signal.

In certain implementations, the circuit further includes a computing device coupled with the signal generator and analyzer, wherein the computing device is configured to compute an electromagnetic characterization of the MUT and to correlate the computed electromagnetic characterization of the MUT to a physical property of the MUT.

In particular aspects, determining a physical characteristic of the MUT comprises: determining the electromagnetic characteristic of the MUT by transmitting an electromagnetic signal over a range of frequencies from the planar sensor system transmitting electrode through the MUT to the receiving electrode; comparing the transmitted signal to the received signal to compute an electromagnetic property of the MUT; developing an algorithm to correlate the computed electromagnetic property of the MUT with a physical property of the MUT; and applying the algorithm to a measured electromagnetic characteristic to determine the physical property.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

BRIEF DESCRIPTION OF THE DRAWINGS

The embodiments of this disclosure will be described in detail, with reference to the following figures, where like designations denote like elements, and where.

Figure 1:
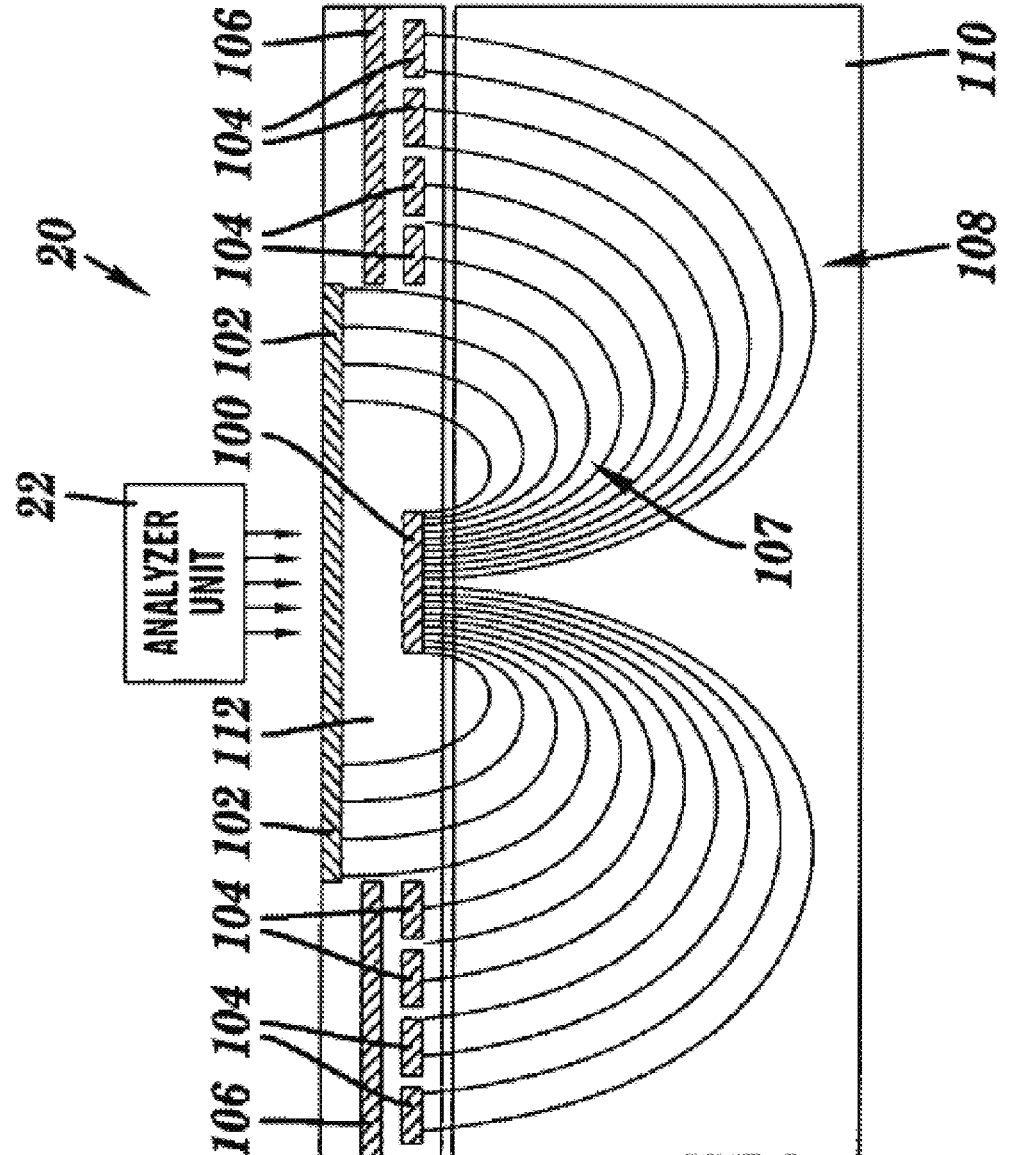
FIG. 1 shows a cross-sectional view of a prior art sensor.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

As described herein, various aspects of the disclosure include systems for characterizing a material under test (MUT). In particular, sensor systems disclosed according to various embodiments include a backer ground plate which enclose the electrodes to create volumes for controlling the parasitic impedance that can cause signal interference in characterization of a MUT.

According to various embodiments, an MUT can include any material capable of being characterized via one or more approaches shown and/or described herein. In various embodiments, an MUT includes an inorganic material such as a soil, an organic material such as grain, or a biological material such as tissue, sub-tissue, organs, fluids, etc. An MUT can include synthetic, composite and/or other blended/modified materials. An MUT can also include elemental materials, as well as materials including impurities. It is understood that the teachings described according to the various embodiments herein can be applied to any MUT described herein, as well as other materials that can be characterized according to the approaches of the various embodiments.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

A prior art sensor configuration in U.S. Pat. No. 7,219,024 is shown in FIG. 1. As shown, a sensor 20 includes an active inner (transmitting) electrode 100, a ground plane 102, and then one or more sense (receiving) electrodes 104. Sensor 20 may also include a guard element (or, guard ring) electrode 106. As shown in FIG. 1, electromagnetic field lines 107 and 108 are created in the material under test (MUT) 110 by applying an electromagnetic signal to the transmitting electrode 100. The electromagnetic field lines 107 are transmitted from transmitting electrode 100 through the MUT 110 to the ground plane 102. The electromagnetic field lines 108 are transmitted from transmitting electrode 100 through the MUT 110 to receiving electrode(s) 104. As described in U.S. Pat. No. 7,219,024, an advantageous function (relative to the then conventional approach) of the ground plane 102 is to intercept the electromagnetic field 107 from the receiving electrode 104 and permit the electromagnetic field 108 that penetrates into deeper portions of the MUT 110 to be measured by the receiving electrode(s) 104. This may provide two advantages: first, a reduced sensitivity to imperfections on the surface of material 110; and second, a measurement of a deeper penetration of the electromagnetic field 108 and hence, a deeper measurement depth into the subsurface of the MUT. Sensor 20 may be in contact with the MUT 110 during use or separated from the MUT 110 by a small air gap. The signal received by the receiving electrode(s) 104 is altered by the impedance characteristics of the MUT 110. Guard element 106 is described as being driven by an electrical potential substantially equal to that present on receiving electrode(s) 104, and is able to substantially reduce interaction of the electromagnetic field 108 with other external sources of electromagnetic interaction.

However, in practice, a problem exists with keeping the guard element 106 at the same electric potential as the receiving electrode(s) 104. The field at the receive electrode 104 varies with the type of MUT being measured. The magnitude of the field is determined only upon measurement of the MUT 110, and cannot be determined a priori. Further, there is a phase shift in the signal, which also varies with the type of MUT being measured. As with magnitude, this phase shift cannot be determined a priori. Further, both the magnitude and phase shift vary with the frequency of the transmitted signal. Thus, while the goal of driving the electric potential of the guard element 106 to be substantially equal to that of the receiving electrode(s) 104 is theoretically desirable, it is impossible in practice. In practice, the potential of the guard element 106 is allowed to float.

Figure 2:
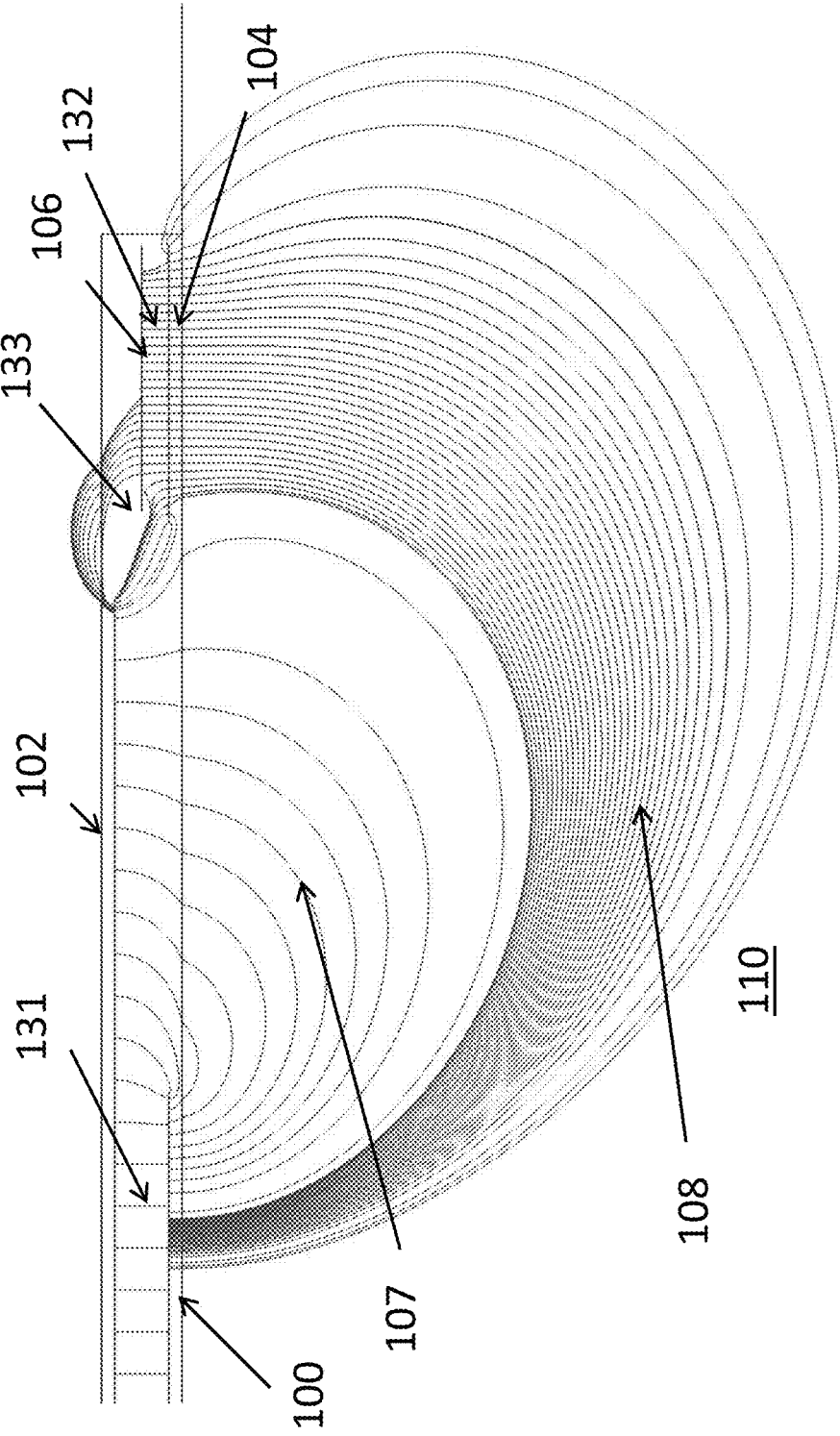
FIG. 2 shows a cross-sectional view of computed field lines associated with the prior art sensor of FIG. 1.

The net effect of this configuration is that the four electrode elements, the transmitting electrode 100, the receiving electrode 104, the ground plane electrode 102, and the floating guard element (or, ring) electrode 106 are all at different potentials, due to the varying magnitude of the field lines interacting with the various electrodes, and the different phases of the signal of those field lines. Using the prior art configuration shown in FIG. 1, field lines were computed using COMSOL Multiphysics®, a software platform available from COMSOL, Inc., of Stockholm, Sweden, in accordance with various implementations disclosed herein. The results of this field line computation are shown in FIG. 2. As shown in FIG. 2, field lines 107 pass through MUT 110 from the transmitting electrode 100, and go to the ground plane 102, illustrated in FIG. 1. FIG. 2 also illustrates the field lines 108 that pass through the MUT 110 from the transmitting electrode 100 and are received at the receiving electrode 104. However, there are additional flows of the field not shown in FIG. 1 that affect the ability of the sensor system to secure accurate reading of the impedance of the MUT 110. First, there is a group of field lines 131 that travel from the transmitting electrode 100 to the ground plane 102. Additionally, there are field lines 132 that travel from the receiving electrode 104 to the guard element (or, floating guard ring) electrode 106. Finally, there are field lines 133 that travel from the guard element electrode 106 to the ground plane 102. The only potentials that can be reliably known in this situation are the potential of the signal sent to the transmitting electrode and the ground plane. Due to attenuation (i.e., reduction in magnitude) of the signal from the transmitting electrode 100, as well as a phase shift of that signal as it passes through the MUT 110 to the receiving electrode 104 (along with variation of these effects with the frequency of the transmitted signal), the quantities of the magnitude and phase of the received signals can be difficult to discern. In addition, there are electromagnetic fields flowing between the receiving electrode 104 and the guard element electrode 106, and between the guard element electrode 106 and the ground plane 102. These fields affect the electric potential of the guard element electrode 106, which in turn affects the effective potential of the receiving electrode 104. As the signals can vary in magnitude and phase, the precision of the measurement of the impedance of the MUT 110 can become degraded in some circumstances. The relative effect of the degradation in signal precision varies with frequency, because as the frequency increases, the attenuation and phase shift of the signal passing through the MUT 110 increases.

Figure 3:
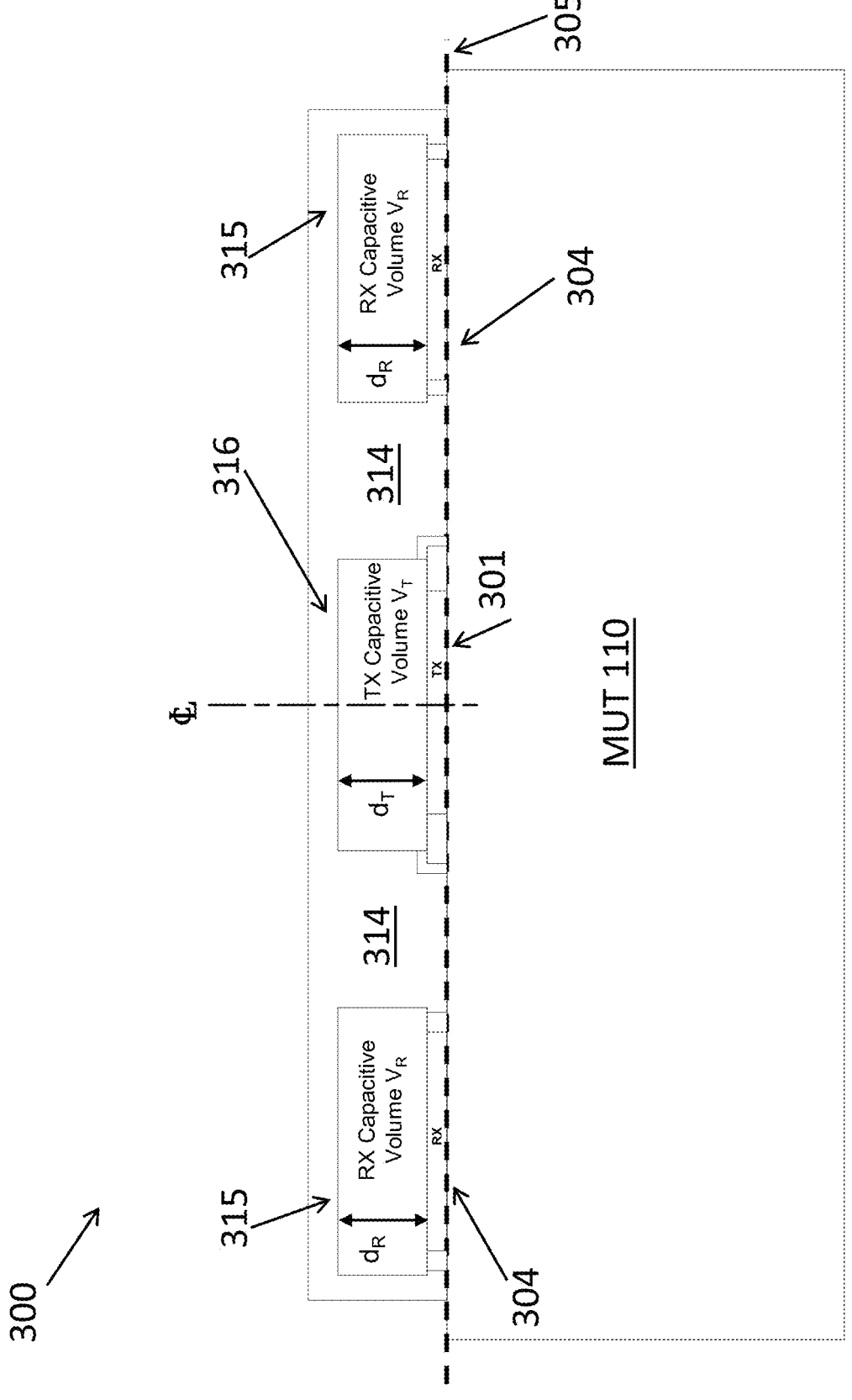
FIG. 3 shows a cross-sectional view of an apparatus according to various embodiments of the disclosure.

According to various implementations, an apparatus 300 (e.g., including an axisymmetric planar sensor, also referred to as a sensor array) is configured to effectively characterize the MUT 110 as shown in the schematic cross-sectional depiction of FIG. 3. Apparatus 300 addresses various shortcomings of the conventional MUT characterization systems. As illustrated in the plan view of the apparatus 300 in FIG. 4, the apparatus 300 has an axisymmetric planar electrode configuration, with a transmitting electrode (TX) 301 at its radial center. A receiving electrode (RX) 304 surrounds the transmitting electrode 301. In various implementations, a conductive backer ground plate (or, backer ground plate) 314 is located both between the transmitting electrode 301 and the receiving electrode 304, and surrounding the receiving electrode 304, and extends from a plane 305 formed by the at least two electrodes and separates the electrodes 301, 304 to create an electrically isolated volume proximate each of the electrodes 301, 304. In various embodiments, the plane 305 is substantially parallel with a surface of the MUT 110 (e.g., within a margin of approximately +/−1-3%) through which the electromagnetic signals pass.

Backer ground plate 314 can be formed of an electrically conductive material. According to particular example embodiments, the backer ground plate 314 is formed of conductive material such as a metal (e.g., aluminum or steel), while the electrodes 301, 304 are formed of a metal such as copper. In some cases, the backer ground plate 314 can extend between neighboring electrodes (e.g., electrodes 301, 304) to the plane 305 formed by those electrodes. That is, the backer ground plate 314 can laterally separate the neighboring electrodes across an entire depth of those electrodes (e.g., as measured from plane 305). The geometry of the backer ground plate 314 can be configured to surround the transmitting electrode 301 and the receiving electrode 304 and create enclosed capacitive volumes (VR) 315, (VT) 316 over both of those electrodes (FIG. 3). These capacitive volumes 315, 316 are physically isolated from each other by the backer ground plate 314. In some cases, the capacitive volumes 315, 316 include recesses corresponding with each of the electrodes 301, 304, and are sealed by the electrodes 301, 304 (including an insulating material between each capacitive volume 315, 316 and the electrodes 301, 304).

In various implementations, the backer ground plate 314 permits control of the impedance of the capacitive volumes 315 and 316 between the electrodes 301 and 304 and the backer ground plate 314. By appropriately sizing the capacitive volume(s), the parasitic impedance of the volumes, YR and VT, may be reduced, which can significantly increase the precision of the signal measured at the receiving electrode 304 (e.g., controlling parasitic capacitance from field lines penetrating distinct depths of the MUT 110). The capacitive volumes, YR and VT, can be sized separately based on the interactions between the sensor geometry and the interaction with the MUT 110. The primary design variable is the distances between the back of the electrodes 301, 304 and the top inside surface of the conductive ground plane backer 314, noted as dR and dT in FIG. 3. These distances and volumes can be sized separately to enhance the performance of each electrode 301, 304 in detecting impedance characteristics of the MUT 110.

As noted herein, the apparatus 300 can include the array of electrodes 301, 304 (or additional electrodes, as discussed herein) for communicating (non-conductively) with a surface and a subsurface beneath the surface of the MUT 110. In particular embodiments, during operation of the apparatus 300, the electrodes 301, 304 can be located in direct contact with the MUT 110. In these embodiments, electrodes 301, 304 are placed in non-conductive (electrical) contact with the MUT 110, such that electrical current does not flow from electrodes 301, 304 to the MUT 110. In other embodiments, electrodes 301, 304 are placed proximate to the MUT 110, but not in physical contact with the MUT 110. In these cases, for a given electrode geometry, placing the electrodes 301, 304 at a distance from the surface of the MUT 110 affects the penetration of signals into the surface and sub-surface of the MUT 110, and the strength and phase of the signal received at the corresponding electrode(s). In any case, the distance between the electrodes 301, 304 and the surface of the MUT 110 can be factored into the calculation of the impedance characteristics of that MUT 110 as derived from the transmitted and received signals.

Figure 4:
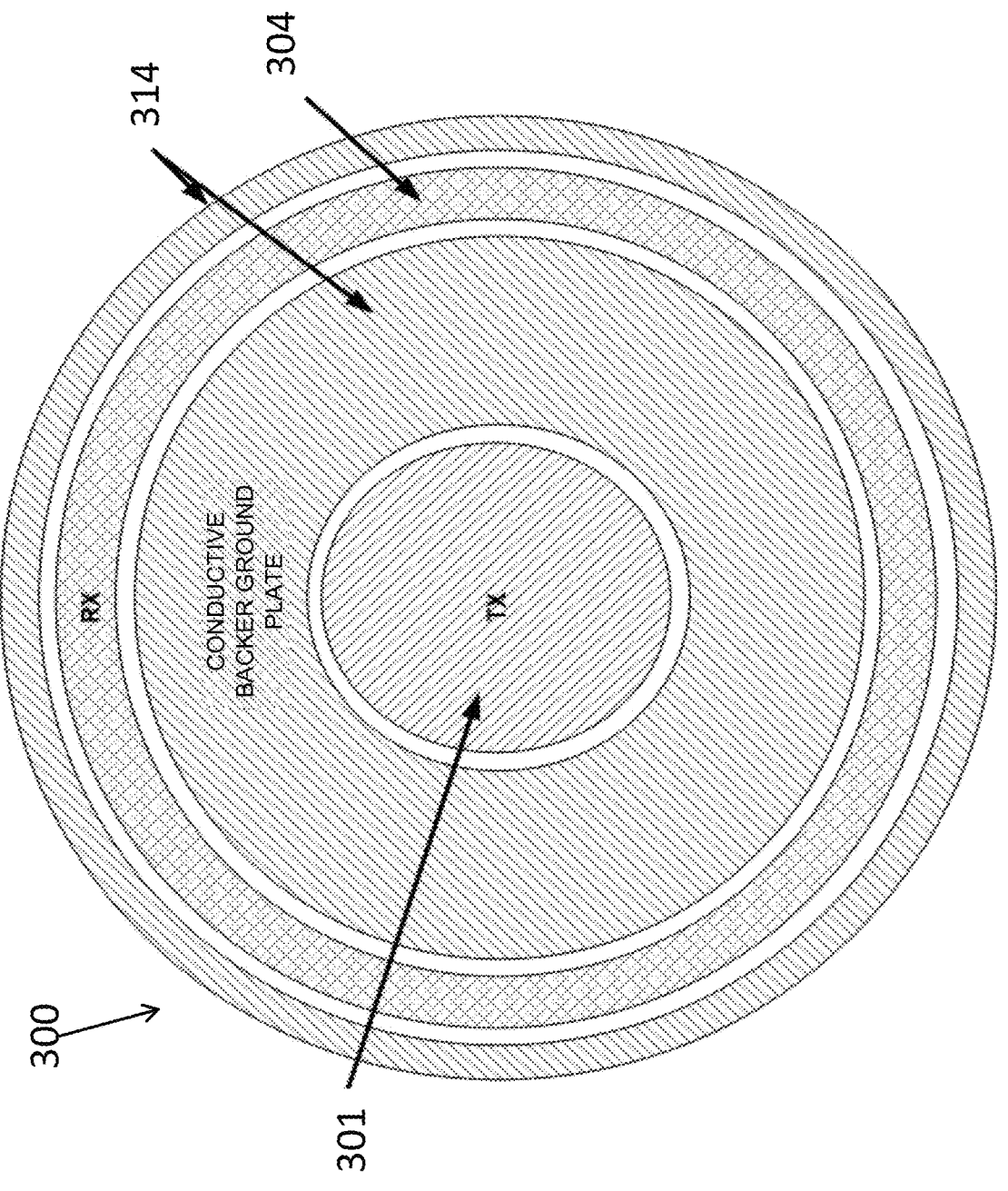
FIG. 4 shows a plan view of apparatus of FIG. 3.

FIG. 4 is a plan view of the apparatus 300, including the transmitting electrode 301 and receiving electrode 304, with the backer ground plate 314 interposed between the two electrodes 301, 304. In this example implementation, the electrodes 301, 304 and the backer ground plate 314 are circular, and aligned symmetrically about a central axis (¢) (FIG. 3). However, it is understood that this alignment and the shaping of electrode 301, 304 is only one example of various possible configurations for apparatus 300. As described herein, apparatus 300 can be configured, modified, etc., to include a linear array of electrodes, or in other cases, may include an arced array of electrodes, a multi-row array of electrodes, or any other configuration of electrodes described in the '112 patent (incorporated by reference herein).

Figure 5:
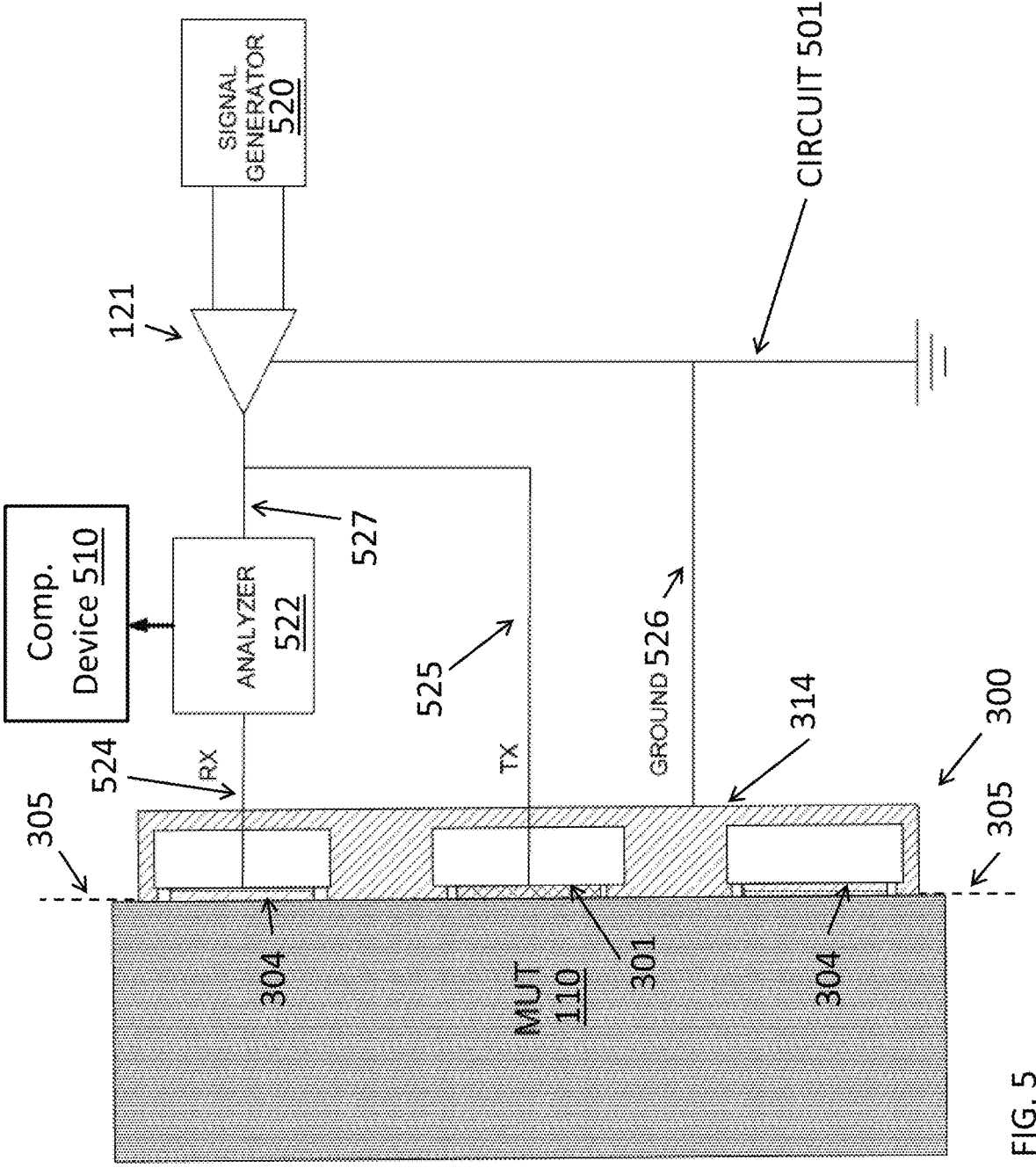
FIG. 5 shows a block diagram of system according to various embodiments of the disclosure.

In various additional implementations, a system 500 is disclosed including the apparatus 300 of FIGS. 3 and 4 coupled with a circuit 501, as shown in the schematic depiction of FIG. 5. Circuit 501 can be electrically coupled with electrodes 301, 304 in order to perform various processes in characterizing the MUT 110. Circuit 501 can be configured to: supply a transmitting signal to the transmitting electrode 301 (e.g., over a range of frequencies), obtain a receiving signal via the receiving electrode 304, compare the received signal with a reference signal to determine a change in an aspect of that signal (e.g., magnitude change and/or phase shift) from the transmitting electrode 301 to the receiving electrode 304, compute the impedance of the MUT 110 (e.g., using a computing device 510), and determine at least one physical property of the MUT 110 based upon the computed impedance. In various implementations, computing device 510 can include a programmable controller or other conventional control logic or architecture for initiating signal transmission, reception and calculation of characteristics of the MUT 110.

Circuit 501 can further include a signal generator 520, which can include a sine wave signal generator such as a direct digital synthesizer (DDS) with a dual output (e.g. such as AD9958, available from Analog Devices, of Norwood, MA). The signal generator 520 can produce a signal over a range of frequencies appropriate for the impedance spectroscopy evaluation of the MUT 110. The raw signal from the signal generator 520 is processed by an operational amplifier 521 (e.g. such as AD8001, available from Analog Devices, of Norwood, MA) to convert the signal to a single output and ground. The output of operational amplifier 521 is split with a first leg 525 going to the transmitting electrode 301 and a second leg 527 going as the reference signal to a signal analyzer 522. The ground 526 of operational amplifier 521 is connected to the backer ground plate 314. The return signal 524 from the receiving electrode 304 is transmitted to the analyzer 522, where it is compared to the reference signal 527 from the signal generator 520 to determine the magnitude change and phase shifts between the return signal 524 and the reference signal 527. These quantities are transmitted to the computing device 510 for computing the impedance of the MUT 110 and correlation of the signal characteristics with physical properties of the MUT 110.

Figure 6:
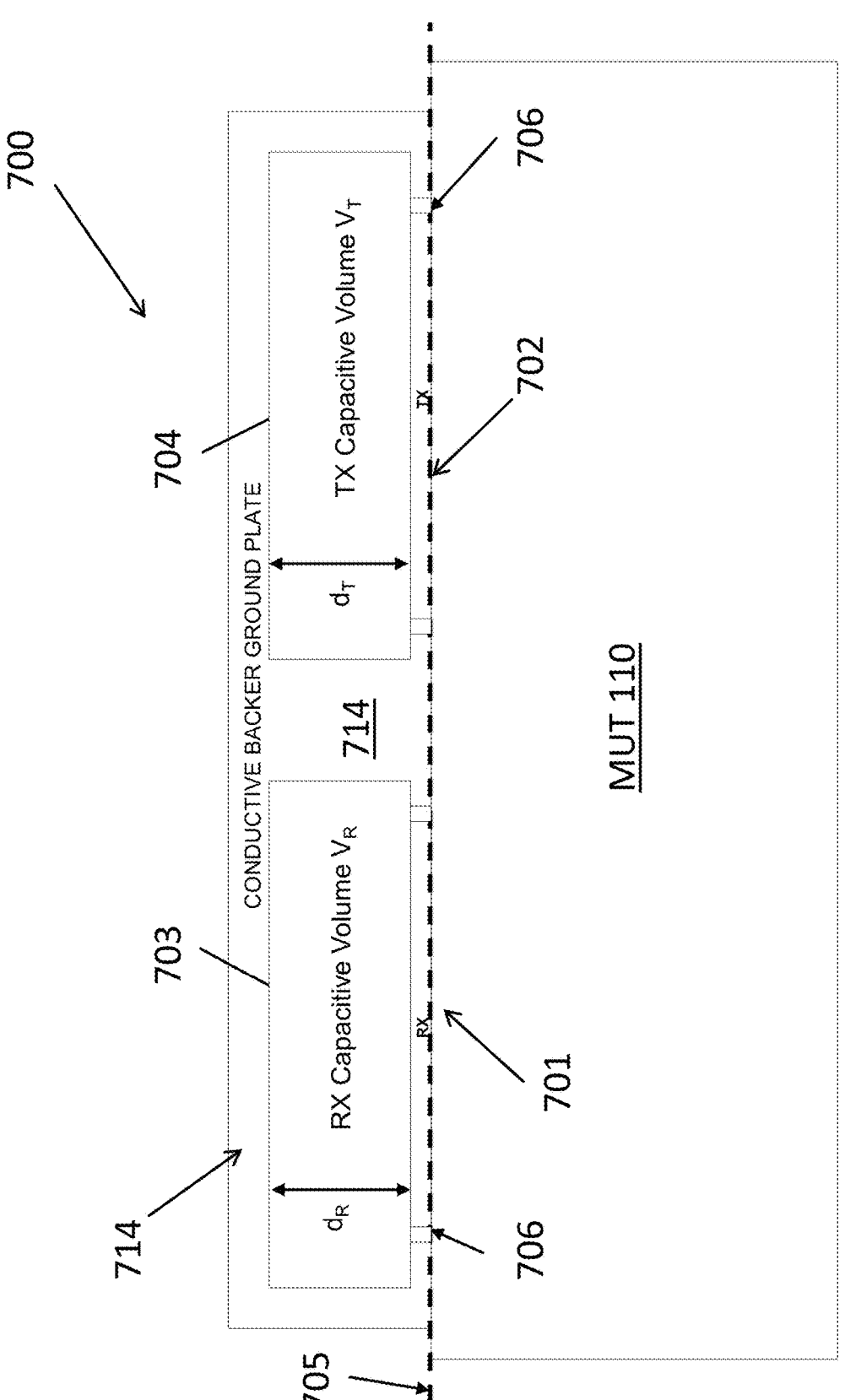
FIG. 6 shows a cross-sectional view of an apparatus according to various additional embodiments of the disclosure.
Figure 7:
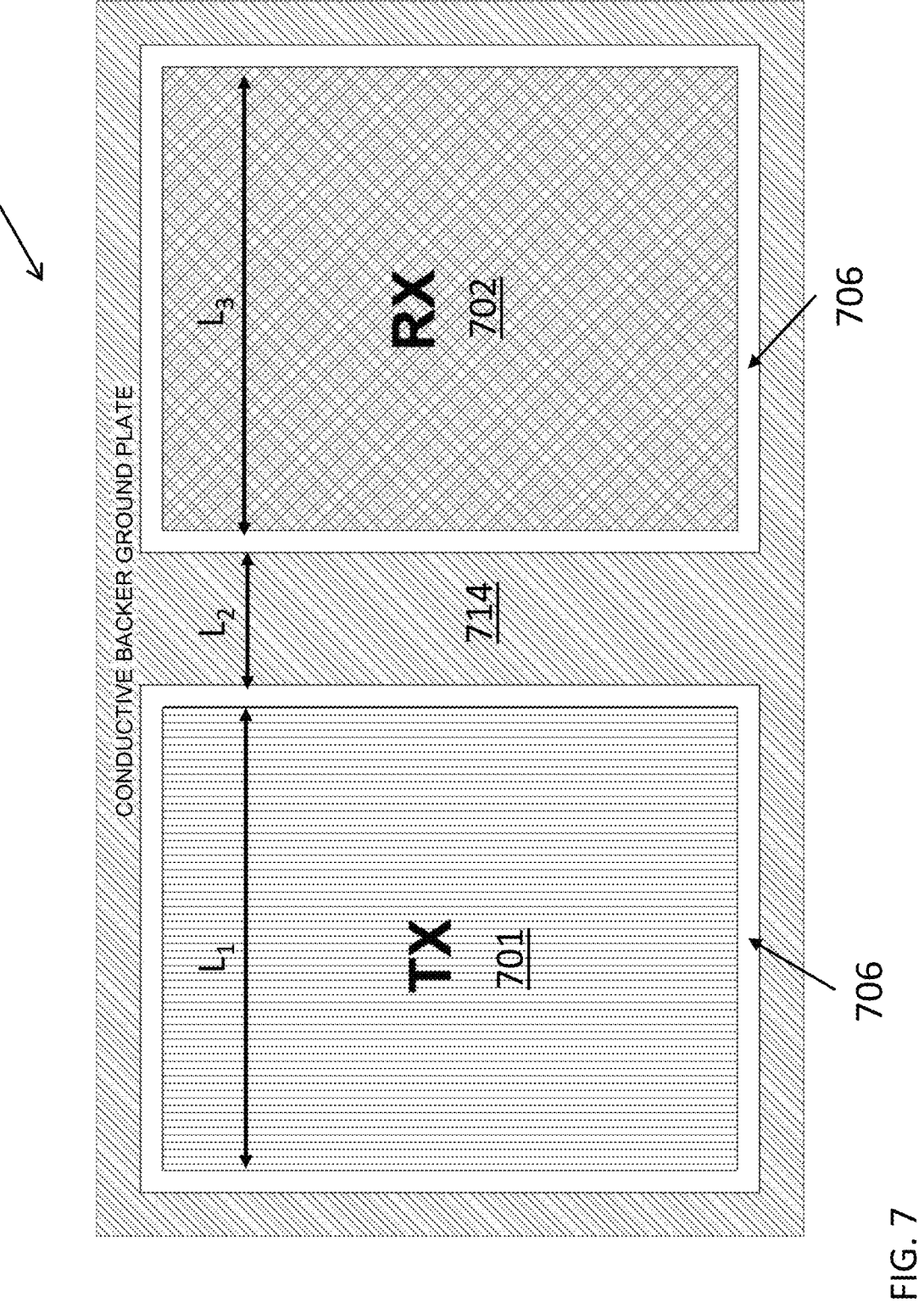
FIG. 7 shows a plan view of the apparatus of FIG. 6.

While the example configuration of apparatus 300 includes axisymmetric electrodes, it is understood that according to various implementations, the electrodes may be linear rather than axisymmetric. Linear electrodes can offer benefits, e.g., reduction in certain dimensions of the sensor to achieve a desired depth of measurement into the subsurface of the MUT 110, or isolation of impedance measurements for particular voxels (or, sub-volumes) of the MUT 110. As is known in the art, the depth of penetration of the electromagnetic field into the MUT is determined by the distance between the transmitting electrode and the receiving electrode(s). In an axisymmetric sensor design such as that shown in apparatus 300, the depth of penetration of the electromagnetic field into the MUT 110 is determined by the radius of the receiving electrode. This is illustrated, for example, in FIGS. 2 and 8. Therefore, a linear electrode design can provide for a deeper penetration into the MUT with a smaller overall size than the axisymmetric sensor. Some aspects of linear electrode configurations are described in U.S. Pat. No. 9,804,112, which is hereby incorporated by reference in its entirety. FIGS. 6 and 7 present illustrations of a cross-sectional side view, and plan view, respectively, of an electromagnetic impedance sensor apparatus (sensor apparatus) 700 with an array of linearly arranged electrodes, according to various embodiments. This sensor apparatus 700 can include a set of linearly arranged electrodes, including a transmitting electrode 701 and a receiving electrode 702 aligned within the same geometric plane 705 with one another, but separated by a conductive backer ground plate (backer ground plate) 714 (similarly to the apparatus 300 of FIGS. 3-5). Backer ground plate 714 can isolate the transmitting electrode 701 and receiving electrode 702, forming distinct capacitive volumes (VT) 703 and (VR) 704, in a similar manner as described with respect to apparatus 300. In use, the electromagnetic field lines in apparatus 700 will be similar to those shown in the field line diagram of FIG. 8 with the field lines going from the transmitting electrode (301 or 701) on the left to the receiving electrode (304 or 702) on the right.

As described herein, in various implementations of the sensor apparatus 700, the backer ground plate 714 permits control of the impedance of the capacitive volumes 703 and 704 between the electrodes 701 and 702 and the backer ground plate 714. By appropriately sizing the capacitive volume(s), the parasitic impedance of the volumes VR and VT, may be reduced, which can significantly increase the precision of the signal measured at the receiving electrode 702. The capacitive volumes, VR and VT, are sized separately based on the interactions between the sensor geometry and the interaction with the MUT 110. In these example implementations, the primary design variable is the distance(s) between the back of the electrodes 701 and 702 and the top inside surface of the conductive backer ground plate 714, noted as dR and dT in FIG. 6. These distances and volumes can be sized separately to enhance the performance of each electrode 701, 702 in characterizing physical properties of the MUT 110 (e.g., controlling parasitic capacitance from field lines penetrating distinct depths of the MUT 110).

Figure 8:
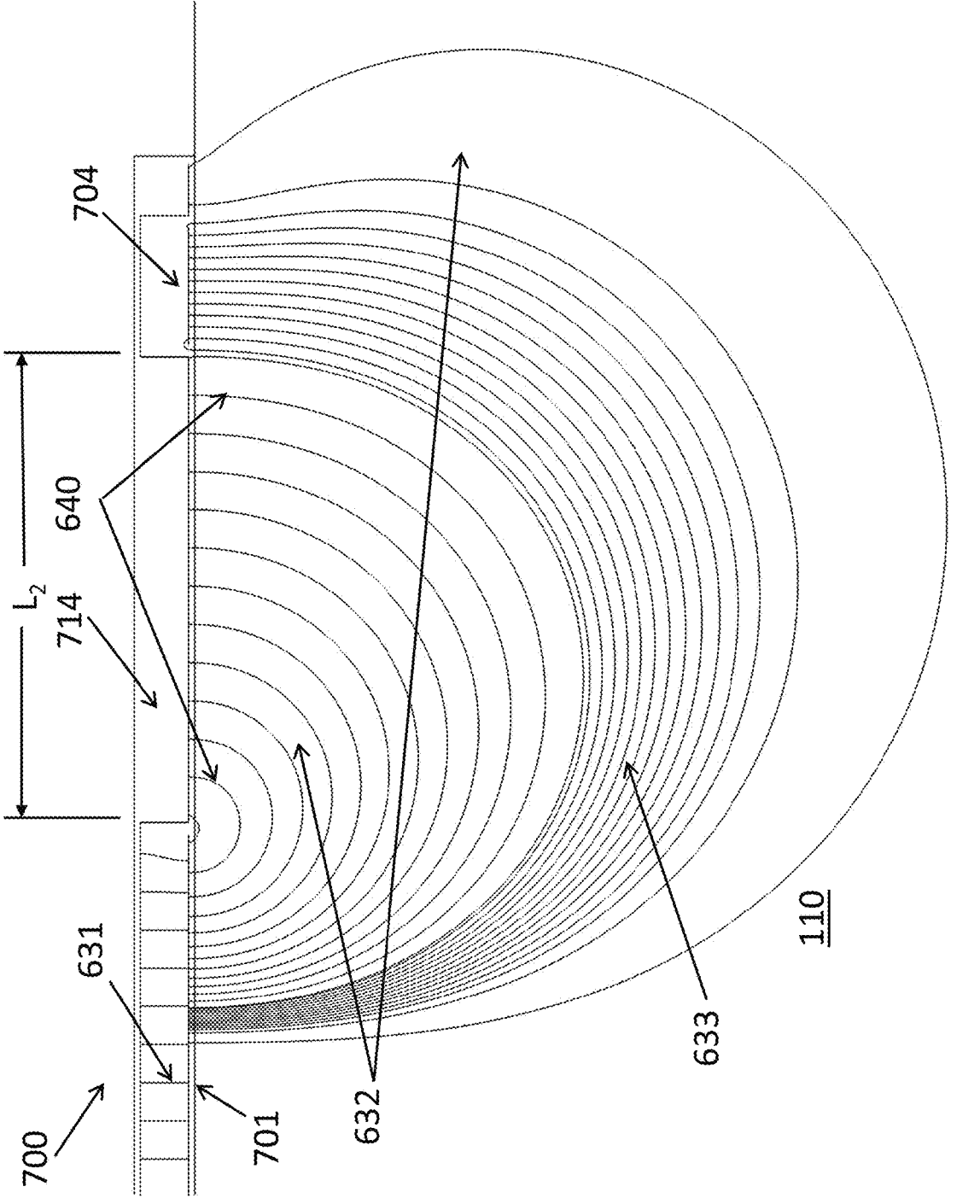
FIG. 8 shows a cross-sectional view of computed field lines associated with the apparatus of FIG. 6.

The sizes and spacing of the electrodes 701 and 7012 shown in FIG. 7 helps to determine the depth that the electromagnetic field line(s) will penetrate into the MUT 110, and where in the MUT 110 measurements of the impedance characteristics of the MUT 110 can be performed. This is illustrated and discussed further in the following sections. Referring to FIG. 7, the length of the transmitting electrode 701 is designated as $L_1$ and the length of the receiving electrode 702 is designated as $L_3$. The spacing between the electrodes in which the conductive backer ground plate 714 extends (along the plane of the electrodes, illustrated as plane 705 in FIG. 6) is designated as $L_2$. There is an electrical insulating barrier between the electrodes and the backer ground plate which is shown as 706 in FIGS. 6 and 7. The separation $L_2$ between transmitting electrode 701 and the receiving electrode 704 causes the electromagnetic field lines that traverse the shallower portions of the MUT 110 to be intercepted by the ground plane 714 before they reach the receiving electrode 704. This causes only the electromagnetic field lines that traverse the MUT 110 at greater depths to be sensed at the receiving electrode 704. This is illustrated in the depiction of field lines traversing the MUT 110 as illustrated in FIG. 8 and discussed herein.

As with the computation performed with respect to FIG. 2, COMSOL Multiphysics® was used to compute the field lines of the sensor apparatus 700 in practice. FIG. 8 shows a schematic depiction of the sensor apparatus 700, including depiction of the field lines produced using this example test. Field lines 632 are shown travelling from the transmitting electrode 701 through the MUT 110 to the backer ground plate 714. Additional field lines 631 are also shown travelling directly from the transmitting electrode 701 the backer ground plate 714 across the gap, dT (FIG. 6). Additionally, field lines 633 are shown travelling from the transmitting electrode 701 through the MUT 110 to the receiving electrode 704. These field lines 633 may be of greatest significance, as they penetrate the MUT 110 and carry the desired information relating to the impedance and/or other physical properties of the MUT 110. The depth to which the field line(s) 633 penetrate into the subsurface of the MUT 110 is primarily a function of the spacing ($L_2$) between the transmitting electrode 701 and receiving electrode(s) 704, (FIG. 7). The placement of the backer ground plate 714 between (e.g., interposed within the same geometric plane 705 as the electrodes) the transmitting electrode 701 and the receiving electrode 704 intercepts field lines that traverse near the surface 640 of the MUT 110, and reduces the impact those field lines would otherwise have on skewing the measurement of impedance and/or other characteristics of the MUT 110 to a volume of the subsurface that is not of interest. Because the backer ground plate 714 provides a constant electric potential, as noted herein, the interference between the receiving electrode 704 and the backer ground plate 714 is minimized. This can improve the precision of the measurement when compared with conventional systems.

Figure 9:
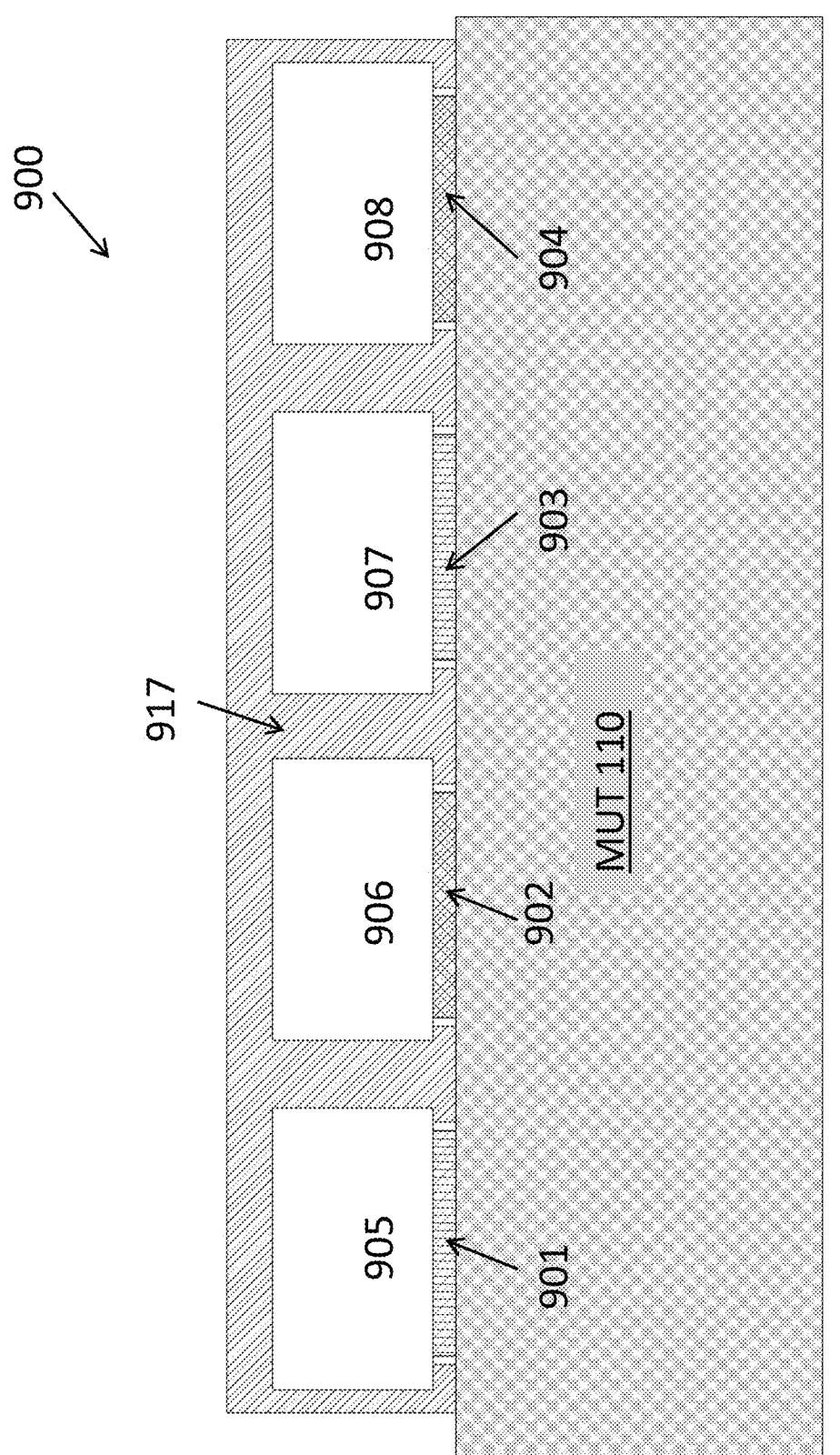
FIG. 9 shows a cross-sectional view of an apparatus according to various further embodiments of the disclosure.

U.S. Pat. No. 9,804,112 (e.g., in FIG. 2) and US Patent Publication No. 2016/0161624 (e.g., in FIG. 13) present sensor arrays with multiple electrodes. FIG. 9 illustrates one example embodiment of an apparatus including a multiple-linear electrode configuration. In this case, an apparatus 900 is shown including a plurality of linearly arranged electrodes. This apparatus 900 includes four linearly disposed electrodes 901(E1), 902(E2), 903(E3), and 904(E4). A conductive backer ground plate (backer ground plate) 917 is shown as having four conductive volumes, 905(V1), 906 (V2), 907(V3), and 908(V4). For purposes of illustration, any of the four electrodes E1-E4 may be a transmitting electrode and the remaining three may be receiving electrodes. For example, where electrode 901 (E1) is the transmitting electrode, the receiving electrodes (902, 903 and 904) will receive the field lines from different volumes of the MUT 110. The geometry of the field lines in this example configuration can be similar to those shown in the example depiction in FIG. 6. In any case, the backer ground plate 917 creates isolated capacitive volumes, 905(V1), 906(V2), 907 (V3), and 908(V4), and creates a uniform voltage potential for all of the electrodes. When compared with conventional systems, these isolated volumes and uniform voltage potential can enhance the accuracy of impedance readings, e.g., of the induced magnitude attenuation and phase shift of the transmitted signal as it passes through the MUT 110.

While FIG. 9 illustrates an electromagnetic impedance sensor apparatus 900 with four electrodes, the actual number of electrodes may be limited only by the strength of the transmitted signal, the depth into the subsurface of the MUT 110 desired to be measured, the number of voxels and sub-voxels desired to be measured, and the ability to measure the attenuated receive signals. As such, any number of electrodes could be deployed using the sensor configuration of apparatus 900 (or any other systems shown and described herein).

The design of the individual electrodes in the various arrays discussed with reference to one or more FIGURES may be circular in shape. However, in some embodiments, a circular-shaped electrode may limit the potential of field concentration available if the desired area of detection in the MUT included a corner or a point. In various embodiments, at least one of the electrodes has an ellipsoid shape. In various other embodiments, as noted herein, at least one of the electrodes has a rectangular shape with rounded corners. In various embodiments, the electrodes may have a uniform area to match their signal generation capacity with corresponding receiving capacity. In some cases, the diameter of the electrodes relative to the distance between the centers of the electrodes may vary. The Applicants have further discovered that there may be a tradeoff between the electric field strength of the array, the geometry factor of the array, and the signal-to-noise ratio of the measurement obtained by the array. Applicants have further discovered that these factors are not determinant a priori to establish the optimum area of the electrode.

Various approaches described allow for determining a physical property of one or more portions (e.g., sub-voxel or a number of sub-voxels) of the MUT 110. In various embodiments, a number of measurements of the physical property(ies) of interest are measured by conventional means and correlated with the measured variations of the measured (and computed) complex impedance (of the MUT, including one or more voxels and sub-voxels) using the apparatuses/systems/approaches described herein. In various embodiments, the number of measurements can be sufficiently large such that the resulting correlation is statistically significant. The impedance measurements can be made with the same type of array that will be used to inspect unknown MUTs, or in other embodiments, a parallel plate electrode arrangement may be used. Regardless of the array geometry, the measurements may also be made over a range of frequencies. Further embodiments include a method of developing an algorithm to correlate the physical property to the measured impedance (of the voxel or sub-voxel over the selected range of frequencies), which may use any number of well-known correlation methods such as analysis of variations (ANOVA), neural networks, and multiple regressions. A determination as to which process, impedance characteristic(s) and frequency range may ensure that the best fit may be made by selection of the one that provides the most statistically significant results.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g., $-1$, $-2$, $-3$, $-10$, $-20$, $-30$, etc.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus comprising:
a planar sensor array of at least four electrodes configured to be placed in electromagnetic communication with a material under test (MUT), wherein during operation, at least one of the electrodes includes a transmitting electrode for transmitting an electromagnetic signal over a range of frequencies through the MUT to at least one receiving electrode in the planar sensor array, wherein the at least four electrodes include a plurality of transmitting electrodes and a plurality of receiving electrodes, wherein the transmitting electrode is selectable among the electrodes of the planar sensor array, and is configured to change between the electrodes of the planar sensor array; and
a conductive backer ground plate at least partially surrounding the at least four electrodes, the conductive backer ground plate being electrically grounded and insulated from the at least four electrodes, wherein the conductive backer ground plate extends from a plane formed by the at least four electrodes and separates the at least four electrodes to create an electrically isolated volume proximate to each of the at least four electrodes, wherein further during operation:
the planar sensor array is in direct physical contact with the MUT and is either electrically non-conductive with the MUT or electrically conductive with the MUT, and
the conductive backer ground plate creates a uniform reference voltage potential for all of the electrodes in the planar sensor array,
wherein the electrically isolated volume proximate to each of the at least four electrodes and the uniform reference potential for all of the electrodes in the planar sensor array enhances precision of impedance readings for the planar sensor array.

2. An apparatus comprising:
a sensor array of at least two electrodes configured to be placed in electromagnetic communication with a material under test (MUT), the at least two electrodes including at least one transmitting electrode and at least one receiving electrode; and
a conductive backer ground plate at least partially surrounding the at least two electrodes and separating the at least two electrodes to create an electrically isolated volume proximate to each of the at least two electrodes.

3. The apparatus of claim 2, wherein the electrically isolated volume enhances a signal to noise ratio (SNR) of signals received by the at least one receiving electrode.

4. The apparatus of claim 2, wherein the electrically isolated volume controls parasitic capacitance from field lines penetrating distinct depths of the MUT.

5. The apparatus of claim 2, wherein a spacing of the conductive backer ground plate between the at least one transmitting electrode and at least one receiving electrode is sized to adjust for a depth of penetration and measurement into the MUT.

6. The apparatus of claim 2, wherein the conductive backer ground plate provides a constant electric potential.

7. The apparatus of claim 6, wherein the constant electric potential mitigates interference between the at least one receiving electrode and the conductive backer ground plate.

8. The apparatus of claim 2, wherein the conductive backer ground plate extends from a plane formed by the at least one transmitting electrode and the at least one receiving electrode.

9. The apparatus of claim 2, wherein the conductive backer ground plate creates a uniform reference voltage potential for all of the electrodes in the sensor array,
wherein the electrically isolated volume proximate to each of the at least two electrodes and the uniform reference potential for all of the electrodes in the sensor array enhances precision of impedance readings for the sensor array.

10. A system comprising:
an apparatus for communicating with a material under test (MUT), the apparatus including:
a sensor array of at least two electrodes configured to be placed in electromagnetic communication with the MUT, the at least two electrodes including at least one transmitting electrode and at least one receiving electrode; and
a conductive backer ground plate at least partially surrounding the at least two electrodes and separating the at least two electrodes to create an electrically isolated volume proximate to each of the at least two electrodes; and
a circuit coupled with the apparatus, the circuit configured to transmit a set of electromagnetic signals through the sensor array through the MUT, and receive at least one return signal from the sensor array.

11. The system of claim 10, wherein the electrically isolated volume: a) enhances a signal to noise ratio (SNR) of signals received by the at least one receiving electrode, and b) controls parasitic capacitance from field lines penetrating distinct depths of the MUT.

12. The system of claim 10, wherein a spacing of the conductive backer ground plate between the at least one transmitting electrode and at least one receiving electrode is sized to adjust for a depth of penetration and measurement into the MUT.

13. The system of claim 10, wherein the conductive backer ground plate provides a constant electric potential.

14. The system of claim 13, wherein the constant electric potential mitigates interference between the at least one receiving electrode and the conductive backer ground plate.

15. The system of claim 10, wherein the conductive backer ground plate extends from a plane formed by the at least one transmitting electrode and the at least one receiving electrode.

16. The system of claim 10, wherein the circuit includes:
a signal generator operating over a range of frequencies for transmitting the set of electromagnetic signals from the at least one transmitting electrode of the sensor array through the MUT, and
a signal analyzer configured to analyze the at least one return signal.

17. The system of claim 16, wherein the circuit further includes a computing device coupled with the signal analyzer, the computing device configured to determine a physical property of the MUT based upon the transmitted electromagnetic signal and the at least one return signal.

18. The system of claim 10, wherein the conductive backer ground plate creates a uniform reference voltage potential for all of the electrodes in the sensor array, wherein the electrically isolated volume proximate to each of the at least two electrodes and the uniform reference potential for all of the electrodes in the sensor array enhances precision of impedance readings for the sensor array.

* * * * *